Nov. 26, 1929.  P. KAJANOFF  1,737,501
APPARATUS WITH SIPHON MECHANISM FOR DELIVERING
DIFFERENT PREDETERMINED QUANTITIES OF LIQUID
Filed April 18, 1928  2 Sheets-Sheet 1

Inventor:
Philippe Kajanoff, by Richard E. Babcock

Att'y.

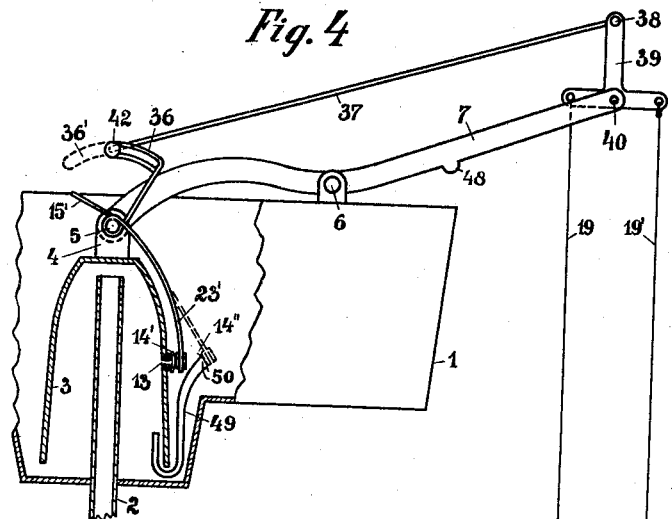
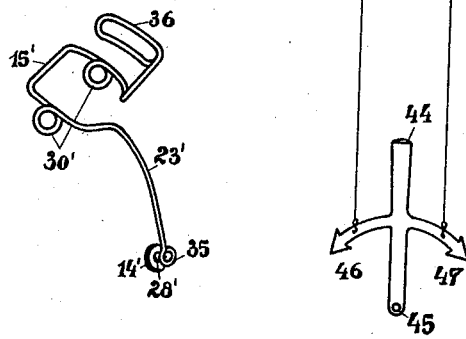
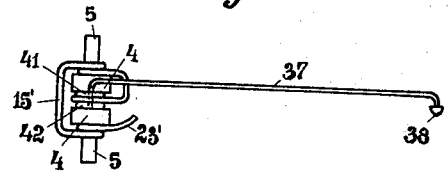

Patented Nov. 26, 1929

1,737,501

UNITED STATES PATENT OFFICE

PHILIPPE KAJANOFF, OF THE HAGUE, NETHERLANDS

APPARATUS WITH SIPHON MECHANISM FOR DELIVERING DIFFERENT PREDETERMINED QUANTITIES OF LIQUID

Application filed April 18, 1928, Serial No. 270,978 and in the Netherlands August 27, 1927.

Apparatus for delivering a limited quantity of liquid by means of a siphon, which is put in action by the fall of a siphon bell is known especially as applied for flushing of water closets. Also devices are known for obtaining with such apparatus a flushing with a part of the usual tank contents in cases where merely urine or tea-leaves are to be flushed away. Although with such devices a considerable amount of water is saved, they have never functioned satisfactorily which is due to the fact that the closing of the aperture at the side of the bell or of a tube communicating with the bell is performed by a slide which often becomes rusty and sticks or leakage of air takes place when the slide or its guiding members become worn.

The object of the present invention is to eliminate these disadvantages and comprises a closing member which at the moment of closing is moved in a direction about at right angles to the plane of the aperture. A further important feature is that the said member is so connected that it is somewhat movable in respect of its support.

In the annexed drawings two convenient embodiments of the invention as shown by way of examples as applied to existing flushing apparatus.

Fig. 4 shows a second embodiment having one single bell lever;

Fig. 5 is a perspective view of the tiltable member used with this second embodiment; and Fig. 6 shows in a plan view the cooperation of the tiltable member and the rod for controlling its position.

Figure 1:
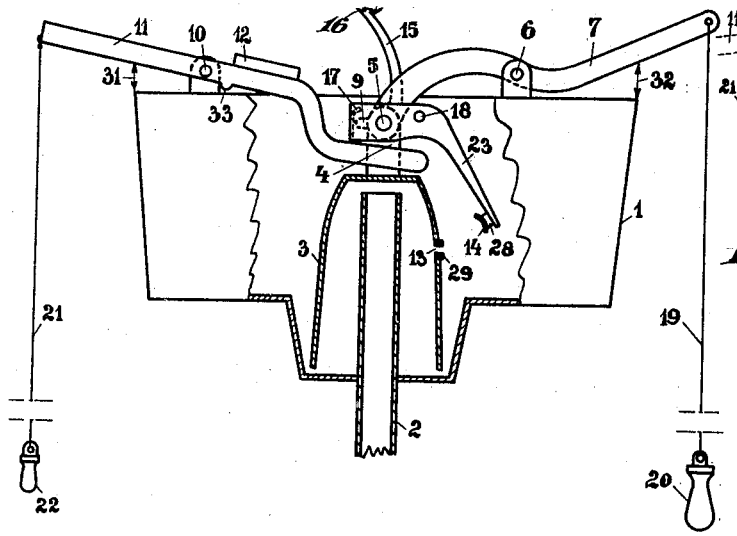
Fig. 1 is a side elevation of the first embodiment having a chain and handle at each side.
Figure 2:
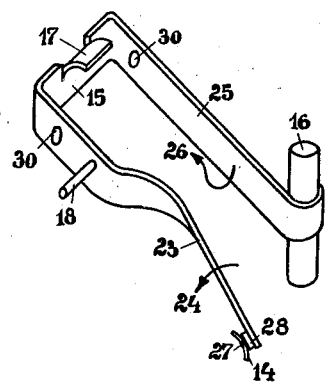
Fig. 2 is a perspective view of the tiltable member.
Figure 3:
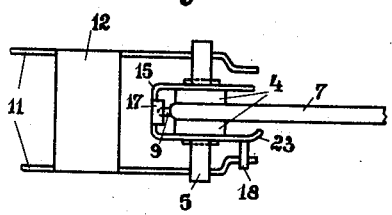
Fig. 3 is a plan view of the centre portion with some parts omitted for clearness.

Referring to the embodiment illustrated in Figs. 1 to 3 a tank 1 with flushing siphon tube 2 and siphon bell 3 having ears 4 is shown as generally used in water closets. By means of a shaft 5 a lever 7 is connected to the bell, which lever is fulcrumed at 6 and carries a pin 9.

Fulcrumed at 10 is a forked lever 11, the inner ends of which carry a weight 12.

In the side of the siphon bell 3 an aperture 13 is formed which may be closed by a rubber disk 14 carried by a tiltable member 15 having a weight 16, a tongue 17 and a pin 18.

Chains 19, 21 with handles 20, 22 are connected at the outer ends of the levers 7 and 11 respectively. As shown in dotted lines in Fig. 1 the outer part of the lever 11 is somewhat longer than the outer part of the lever 7, so that if both levers are applied at the same side the chains 19 and 21 hang some distance away from each other.

For illustrating the manner in which the tiltable member 15 may be manufactured from a single metal strip, this member is shown in Fig. 2 before its arm 23 is turned through 90° in the direction of the arrow 24 and its arm 25 is bent upwards in the direction of the arrow 26.

According to the invention the closing member 14 may be made of a thin flexible disk, which is attached by means of a pin having head 27 to a block 28 of cork, which is connected to the arm 23, by bending the latter around the former. If desired a lining 29 of rubber or other material may be applied for the aperture 13.

As the tiltable member 15 is rotatably connected to the bell 3 by inserting the shaft 5 through holes 30, the disk 14 at the moment of closing the aperture 13 is moved about at right angles to the plane of this aperture, which has the advantage that should for any reason a little distance remain between the disk 14 and the aperture 13, a complete closing of the latter will be automatically attained by the sucking force of the siphon, whilst by the somewhat movable connection of the disk 14 a perfect closing is assured even if at its closing position the block 28 does not occupy the most desirable situation with respect to the aperture 13.

The apparatus functions as follows:

In the position of rest, the lever 11 is held by an abutment such as 33 against clockwise movement. If the handle 22 is pulled down, the inner ends of the lever 11 engage the under side of the shaft 5 so that the bell 3 is lifted. In the position shown, the tiltable member 15, is held by the weight 16 being situated to the left of the shaft 5, the inner end of the lever 11 even in its highest position remaining a little distance away from the pin 18. If however the member 15 occupies its closing position, the pin 18 by being situated at a lower point would be lifted by the movement of the lever 11, so that the member 15 would be brought to the shown position, which displacement is started by the lever 11, but completed by the weight 16. Now when the bell 3 is allowed to fall, the siphon is put in action and the flushing is started. However upon arrival of the water lever at the aperture 13 air is sucked within the bell 3, so that the siphon action is interrupted and the flushing is only performed with a part of the tank contents. When lifting the bell 3 by pulling down the handle 22 the lever 7 is turned clockwise but only so far that the pin 9 rests against the tongue 17.

If however the handle 20 is pulled down the lever 7 is turned clockwise through a greater angle, the distance 32 being greater than the distance 31, by which further turning, through the action of the pin 9 against the tongue 17, the member 15 is turned sufficiently from the position shown to get the weight 16 to the right of the shaft 5, the weight then completing the closing of the rocking member 15. In the closing position (not shown) of the member 15, the disc 14 rests against the aperture 3, but the pin 18 is still some distance away from the inner end of the lever 11. The aperture 13 being or remaining closed by pulling down the handle 20, it will be apparent that after releasing said handle 20 the flushing is executed with the whole contents of the receptacle 1.

For easily distinguishing between the two flushings the handle 22 may be smaller than the handle 20.

This first embodiment has the advantage, that, should no space be available at the left side of the apparatus, the lever 11 may be applied at the right hand side as indicated with dotted lines, merely by using a longer shaft 6.

Now referring to the second embodiment illustrated in Figs. 4 to 6 the second lever 11 is replaced by a more simple controlling means 37, 39 and the two handles 20—22 by a single lever 44.

The tiltable member 15′ is obtained by merely bending a wire in such a manner, that a ring 35 is provided for holding the block 28, loops 30′ for receiving the shaft 5 and a slot 36. The weight 16 may be applied but in the drawing it is dispensed with and its function is replaced by friction between the outer sides of the ears 4 and the inner sides of the loops 30′.

The controlling rod 37 is rotatably connected to a T-shaped lever 39 by means of a bend portion with button 38, this lever being fulcrumed at 40 at the outer end of the usual lever 7. At the inner end of the rod 37 there is another bend portion carrying two flanged disks 41 and 42 screwed thereon and forming a slidable connection between the rod 37 and the member 15′.

At the horizontal ends of the T-shaped lever 39 chains 19 and 19′ are provided, the lower ends of which are connected to a lever 44 which at 45 is pivotally connected to the wall and may conveniently be provided with two arrows 46 and 47 carrying inscriptions such as "little" and "great" respectively.

This second embodiment functions as follows:

In the shown position of the tiltable member 15′ the aperture 13 is closed and in the position of rest the disks 41, 42 are at the left end of the slot 36. If now the lever 44 is turned in the direction of the arrow 47 not only the outer end of the lever 7 is pulled down, but at the same time the T-shaped lever 39 is turned clockwise, which however merely causes the disks 41, 42 to slide towards the right end of the slot 36. If however the lever 44 is turned in the direction of the arrow 46 the T-shaped lever 39 is turned anti-clockwise, which causes the tiltable member 15′ to be rocked to the position in which the aperture 13 is fully open and the slot 36 occupies the position 36′ indicated with dotted lines.

It will be apparent that by this second embodiment the possibility of having at will a flushing with the whole contents of the tank or with a certain part thereof, determined by the situation of the aperture 13, is attained by extremely simple means.

The lever 44 is to be turned till a rubber stop 48 abuts against the upper edge of the tank 1. In practice however this lever may be turned clockwise sufficiently for starting the siphon action upon releasing, but not far enough for turning the member 15′ fully in its closing position. For meeting this inconvenience the arm 23 may be formed as a very thin and consequently very flexible leafspring and the slot 36 shortened so that the aperture 13 is closed if the lever 44 is turned clockwise so far that the siphon action is caused upon its releasing when it is returned to its position of rest by the falling of the bell 3.

If the authorities will not allow the bell 3 to have an aperture, a separate tube 49 may be applied, the end 50 of which is closed or opened in a similar way, (shown in dotted lines) to that of the aperture 13. This tube, which leads to the inner space of the lowered bell, may be fixed to the tank 1 or to the bell 3.

The known means for filling the tank and determining the maximum water level are omitted from the drawings for clear illustration of the essential features.

Having fully described my invention, what I claim is:

1. A tank, an outlet pipe projecting into said tank, and a movable bell fitting over said projecting end of said pipe and movable to cause flow of water by siphon action from said tank out through said pipe, in combination with means for causing movement of said bell to start such siphon action, a valve operable at will to allow or to prevent the entry of air from said tank into the interior of said bell, whereby the full contents of said tank may be discharged or only a portion thereof down to a predetermined level if the air control valve is in its position for allowing the entry of air into said bell from said tank, and means pivotally mounted on said bell and having a free end portion movable in an arcuate path, said valve being mounted on said free end portion 2. A tank, an outlet pipe projecting vertically upward in said tank, and a movable bell fitting over said pipe and movable to cause flow or fluid by siphon action from said tank out through said pipe, said bell having an aperture between its lower edge and its top and adapted to form communication through said bell between the interiors of said bell and tank to interrupt at will the discharge of water from said tank through said pipe when the water has reached a predetermined level in said tank, in combination with means for raising said bell and permitting it to fall, a movable closure for said aperture, and means for moving said closure in a free swinging movement toward and against or away from the face of said bell adjacent and about said aperture to close or open the same.

3. A tank, an outlet pipe projecting vertically upward in said tank, and a movable bell fitting over said pipe and movable to cause flow of fluid by siphon action from said tank out through said pipe, said bell having an aperture between its lower edge and its top adapted to form communication between the interiors of said bell and tank to interrupt at will the discharge of fluid from said tank through said pipe when the fluid has reached a predetermined level in said tank, in combination with means for raising said bell and permitting it to fall, a movable closure mounted for swinging movement toward and from said bell and adapted to close said aperture, and means for raising said bell and permitting it to drop and at will previously causing the movement of said closure means to operative closing or to inoperative open position.

In testimony whereof I have signed my name to this specification.

PHILIPPE KAJANOFF.